United States Patent [19]

Hughes

[11] 4,032,701
[45] June 28, 1977

[54] CONTINUOUS METHOD FOR PRODUCING A DRY, SOLID POLYACRYLAMIDE

[75] Inventor: John Hughes, Arlington Heights, Ill.

[73] Assignee: American Colloid Company, Skokie, Ill.

[22] Filed: Sept. 5, 1975

[21] Appl. No.: 610,547

[52] U.S. Cl. .................................. 526/88; 526/229; 526/303

[51] Int. Cl.² .................. C08F 2/00; C08F 120/00; C08F 120/56

[58] Field of Search .................. 260/89.7 R, 89.7 S; 526/88

[56] References Cited

UNITED STATES PATENTS

| | | | |
|---|---|---|---|
| 2,983,717 | 5/1961 | Henley et al. | 260/89.7 R |
| 3,042,970 | 7/1962 | Terenzi | 260/80 M |
| 3,242,152 | 3/1966 | Goren | 260/89.7 R |
| 3,663,518 | 5/1972 | Patzelt et al. | 260/89.7 R |
| 3,732,193 | 5/1973 | Svarz | 260/79.3 MU |
| 3,755,280 | 8/1973 | Saunders | 260/89.7 S |
| 3,820,957 | 6/1974 | Mihalev et al. | 526/72 |

Primary Examiner—Joseph L. Schofer
Assistant Examiner—Herbert J. Lilling
Attorney, Agent, or Firm—Poms, Smith, Lande & Glenny

[57] ABSTRACT

A process for producing polyacrylamide in a dry and solid form which includes the steps of mixing from 20 to 40% by weight of water and from 60 to 80% by weight of acrylamide to form an aqueous mixture thereof; heating said aqueous mixture to a temperature of between about 50° C and 100° C to form one phase aqueous liquid composition; depositing, on a surface, said one phase aqueous liquid composition and a catalytically effective amount of an aqueous solution of a water soluble polymerization catalyst for the acrylamide, said depositing being done in such a manner so as to form a mixture of said one phase aqueous liquid and said catalytic aqueous solution, said surface being heated to a temperature of between about 50° C and the charring point of polyacrylamide, whereby the acrylamide exothermically polymerizes to form polyacrylamide whereby all the water is evaporated and there is formed a dry, solid polyacrylamide and, after said water has evaporated, removing the polyacrylamide from said surface and, if desired, grinding the polyacrylamide to the desired particle size. It is preferred if the surface is moving at a rate of speed such that the polyacrylamide is brought to the removal point after the water is removed therefrom. In the more preferred exemplary embodiment, the moving surface is in the form of a relatively flat disc moving in a circular manner and is heated by gas burners.

5 Claims, No Drawings

CONTINUOUS METHOD FOR PRODUCING A DRY, SOLID POLYACRYLAMIDE

BACKGROUND OF THE INVENTION

As is known in the art, polyacrylamide is in general a white, solid polymer having a relatively high molecular weight and has the formula ($CH_2CHCONH_2$) and is useful in a variety of industries. For example, in its dry state, it is useful in earth filled dams, in conjunction with bentonite, to prevent seepage of water. In addition, it has been utilized in drilling muds, again in conjunction with expanding lattice clays such as bentonite. Since polyacrylamide in these industries, and others, is utilized as a dry solid it is, in general, desirable if when the polymer is produced it is in the form of a dry solid polymer which does not need further processing to be used per se except, perhaps, grinding the solid into a smaller particle size.

As noted, if a polymer is to be utilized in the dry form it is desirable to product that polymer in the same form as it is to be used. It is therefore not surprising that certain workers in the art have attempted to produce dry polymer of acrylic acid wherein the polymer is in the dry form. Patents that may be mentioned are U.S. Pat. Nos. 2,833,745; 2,956,046; and 3,058,958. These patents deal primarily with producing dry salts of acrylic resins and, in general, are not applicable to polyacrylamide polymers and, moreover, the methods disclosed in these patents are relatively complicated and inefficient.

For example, U.S. Pat. No. 3,058,958 discloses a method for polymerization of acrylic salts as a thin film. The patent discloses a very complicated method in that rollers are provided which are driven in opposite directions and the polymerization solution drips onto the rolls. The polymerization solution itself is an aqueous solution of calcium acrylate, sodium acrylate, and an initiator. According to the patent the calcium acrylate increases the effective polymerization rate. The initiator is in the same solution as the sodium and calcium acrylate and the solution is not preheated which is essential in the present invention.

U.S. Pat. No. 2,956,046 discloses a very complicated method of producing dry acrylic acid polymers by spray polymerization thereof. The aqueous dispersion of sodium acrylate in a catalyst is dispersed into heated air having a temperature of 350° F to 400° F which, as noted above, is very inefficient and, moreover, could not be used in the instant process.

U.S. Pat No. 2,833,745 discloses a process for producing sodium polyacrylate in which the critical portion of the patent apparently resides in the fact that the initiator must be added during the evolution of carbon dioxide. As is readily apparent this is a complicated method of producing a dry salt and moreover is not applicable to producing polyacrylamide.

SUMMARY OF THE INVENTION

The present invention provides an efficient process for producing polyacrylamide in a dry and solid form which obviates the numerous deficiencies in the prior art methods which have attempted to produce various polymers in a dry solid form. The present invention provides such an efficient process by, in part, carefully mixing a selected amount of acrylamide with water and preheating this mixture so that a solution is formed prior to mixing with the catalyst for the polymerization reaction. Since the polymerization reaction is exothermic and because the surface on which the polymerization occurs is preheated the water is removed as steam. Moreover none of the acrylamide monomer is wasted or lost and the polyacrylamide polymer resulting therefrom is in a dry, solid form and containts no water.

It is therefore the primary object of the present invention to disclose and provide a method and process for producing polyacrylamide in a dry, solid form ready for immediate use without the necessity of further processing except for grinding to a desired particle size.

Another object of the present invention is to disclose and embody a method for producing polyacrylamide in which acrylamide is mixed with water and this mixture preheated to a temperature of between about 50° C and 100° C to form a one phase liquid aqueous composition and, thereafter, depositing said one phase liquid and an aqueous solution of a polymerization on a heated surface catalyst to form a mixture of the two said surface being heated to a temperature of between 50° C and charring point of polyacrylamide.

Other and further objects of the present invention will be readily apparent from the following detailed description wherein parts and percentages are by weight, unless otherwise stated.

DESCRIPTION OF THE PREFERRED EMBODIMENT

The present invention accomplishes the foregoing objects, and others, by first forming a one phase liquid aqueous composition of water and acrylamide. This one phase composition is formed by mixing acrylamide and water and heating the mixture to a temperature of between about 50° C and 100° C. It is necessary in the method of the present invention that said mixture is preheated.

The amount of acrylamide in the aqueous composition is not as critical as the temperature and, in general, it is preferred if the aqueous composition is composed of from 60 to 80% acrylamide and 20 to 40% water, said percentages being by weight and based on the total weight of the acrylamide and water.

it is also necessary in the present invention to use a polymerization catalyst for the acrylamide. Such catalysts are well known in the art and the present invention is not predicated upon the use of such catalysts. Solely for the purposes of exemplification there may be mentioned various sulfites, bisulfites, persulfates, peroxide, etc. the only criterion being that the polymerization catalyst must be water soluble. For example, I have found that the alkali metals of sulfites, bisulfites and persulfates are excellent as are ammonia sulfite, bisulfite and persulfate.

The amount of catalyst is not particularly critical and may range from 0.1 to 5%, by weight, based on the weight of the acrylamide. Because the aqueous solution of acrylamide must be mixed with the catalyst the catalyst is preferably added to the acrylamide as a water solution, the amount of catalysts in the water solution being not important. For example, the concentration of the catalyst may range from 10% by weight to the saturation point of the particular catalyst which, in the case of ammonium persulfate, would be about 40% to 0° C.

In order to provide a continuous process it is preferred if the surface on which the acrylamide and catalyst are deposited is a moving one. As has been noted, this moving surface is preferably flat and moving at a rate of speed such that the polyacrylamide that is formed by the reaction is not contacted by the acrylamide monomer or the aqueous solution of polymerization catalyst. In the preferred exemplary embodiment, the moving surface is a rotating metal disc (e.g., steel, aluminum, etc.) which is approximately six feet in diameter. The rotating metal disc is heated with natural gas burners, the temperature to which the metal disc is heated being between 50° C and the charring point of the polyacrylamide. The disc is moving at a rate of speed such that the polymer formed can be removed prior to the point at which the disc reaches the deposit of the aqueous solution of acrylamide and the aqueous solution of the polymerization catalyst.

In order to more fully exemplify the present invention, a preferred exemplary embodiment will be set forth below.

Solid acrylamide is mixed with water, at room temperature. The amount of acrylamide was 60 parts by weight and the amount of water was 40 parts by weight. This mixture was then heated to approximately 55° C at which point there was formed a one phase aqueous liquid composition. At approximately the same time two saturated solutions were made up of ammonium persulfate and sodium bisulfite. All three solutions were poured onto a rotating metal disc having a temperature of approximately 90° C and a diameter of six feet. The metal disc was heated with gas burners located on the opposite side of the discs from the side on which the aqueous liquid compositions were poured on to the disc. The amount of sodium bisulfite was 0.3%, based on the weight of the acrylamide, and the amount of ammonium persulfate was 1%, based on the weight of the acrylamide. All three solutions were deposited on the surface in such a manner that all three were mixed together and, almost immediately, a polymerization reaction occurred wherein polyacrylamide was formed. At the same time, due, in part, to the exothermic polymerization reaction, the water was removed as steam. The dry solid polyacrylamide was then removed from the rotating disc by, for example, a scraper and, if desired, the dry solid polyacrylamide was ground to a desired particle size.

From the foregoing, it is readily apparent that although the invention has been exemplified with reference to specific polymerization catalysts, concentrations and temperatures, that all of these may vary without departing from the spirit and the scope of the present invention.

I claim:

1. A process for producing dry, solid, polyacrylamide which comprises forming an aqueous mixture consisting essentially of from 60 to 80%, by weight, of acrylamide and from 20 to 40%, by weight, of water; heating said aqueous mixture to a temperature of between about 50° C and 100° C to form a one phase liquid aqueous composition; depositing, separately on a moving surface (1) said aqueous one phase liquid and (2) a catalytically effective amount of an aqueous solution of a water soluble polymerization catalyst for acrylamide, in such a manner so as to form a mixture of said one phase aqueous liquid and said aqueous solution, said surface being heated to a temperature of between about 50° C and the charring point of acrylamide whereby the acrylamide exothermically polymerizes to form polyacrylamide thereby causing all of the water to evaporate and forming a dry, solid polyacrylamide and removing said polyacrylamide from said surface.

2. A method according to claim 1 wherein the polymerization catalyst is a member selected from the group consisting of an alkali metal and ammonium sulfite, bisulfite and persulfate.

3. A method according to claim 1 wherein the polymerization catalyst is selected from the group consisting of sodium bisulfite and ammonium persulfate.

4. A method according to claim 1 wherein the polymerization catalyst is present in an amount of from 0.1 to 5%. by weight, based on the weight of the acrylamide.

5. A method according to claim 1 wherein the moving surface is a rotating disc.

* * * * *